Oct. 22, 1935.  C. L. ZAKHARTCHENKO  2,018,001
AIRCRAFT
Filed June 27, 1931  3 Sheets-Sheet 1
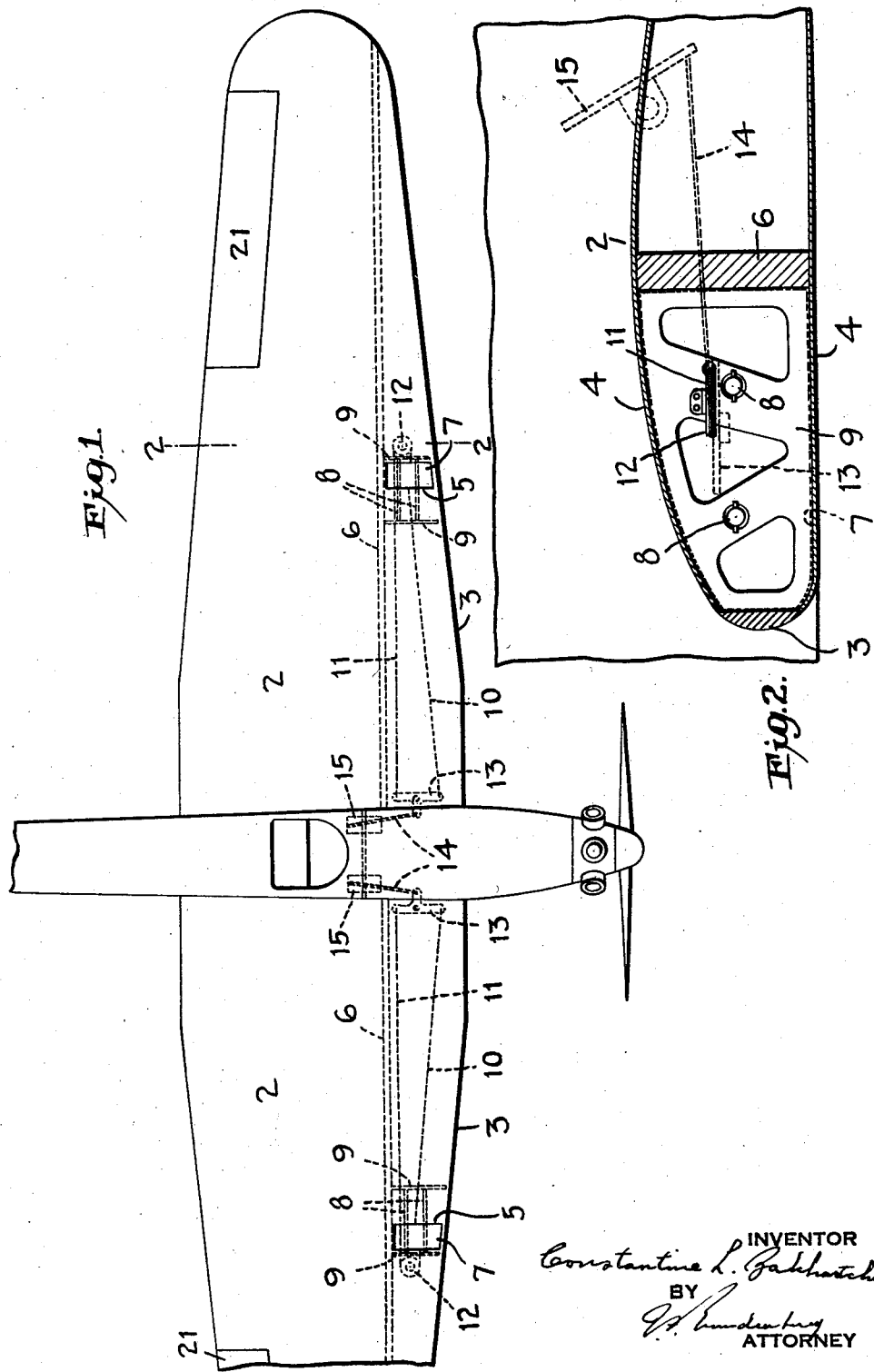

Oct. 22, 1935.  C. L. ZAKHARTCHENKO  2,018,001
AIRCRAFT
Filed June 27, 1931  3 Sheets-Sheet 2
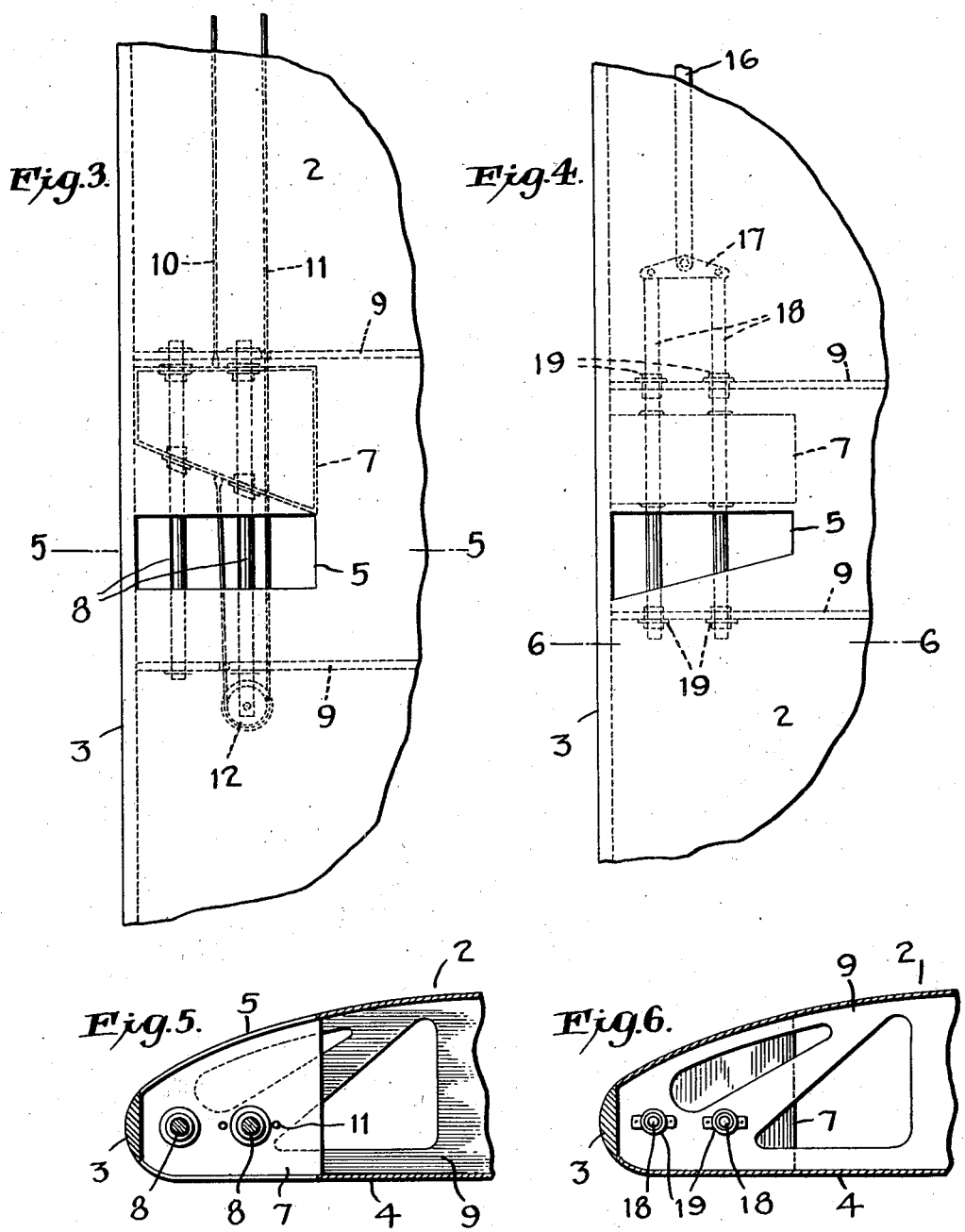
INVENTOR
Constantine L. Zakhartchenko
BY
ATTORNEY Oct. 22, 1935.    C. L. ZAKHARTCHENKO    2,018,001
AIRCRAFT
Filed June 27, 1931    3 Sheets-Sheet 3

INVENTOR
Constantine L. Zakhartchenko
BY
ATTORNEY

Patented Oct. 22, 1935

2,018,001

UNITED STATES PATENT OFFICE 2,018,001

AIRCRAFT

Constantine L. Zakhartchenko, Beechhurst, Long Island, N. Y., assignor to Zee Aircraft Corporation, a corporation of New York Application June 27, 1931, Serial No. 547,212

5 Claims. (Cl. 244—12)

My invention relates to the art of aerial navigation, and more particularly to aircraft of the heavier-than-air variety.

Among the objects of the invention are the following:

To make it possible to increase the gliding angle, or to descend on a steeper flight path, which is much desired. Also, consequent upon this, shortness of landing run.

To make the angle of stall less critical, by causing the decrease of lift to be more gradual beyond the maximum angle of incidence of the wings which gives maximum lift. Also to increase the angle of stall, and thus the useful range of the angles of attack.

To make the lateral controls more effective near the stalling angle, or to keep them effective even past the stalling angle. Also to improve lateral stability at high angles of attack. This increases the safety of the plane by diminishing the possibility of the machine going into an undesired tail-spin. It aids materially in effecting steep landings, since the machine can be brought down under control with the elevator well up, giving the wings or airfoils a high angle of incidence, and the pilot will feel that he is safe in doing so.

The loss of lateral stability at high angles is due mainly to the auto-rotative tendency of the wings. By this invention, the range of auto-rotation can be greatly decreased by opening the herein-described slots. In this respect, the invention differs from other constructions, the operation of which may shift the self-starting rotative range to higher angles of attack but without materially reducing its magnitude, in some cases even increasing it.

To provide a form of air brakes, advantageous for avoiding collision in mid-air, for shortening landing runs, for facilitating successful landings on airplane carriers or other restricted areas, and for other purposes.

To provide a novel and highly effective directional control, useful in conjunction with, or instead of, the usual rudder control. Furthermore, to facilitate the maneuvering of military planes, and to make possible maneuvers which can not now be performed.

These objects, not all of which need be fully realized in a given application of the invention, are attained by the provision, as hereinafter described, of one or a few isolated, narrow slots or openings of vertical character, extending rearward from the leading edge, or from near the leading edge of the wing. In most cases these slots are ordinarily closed, and means are provided for opening them and for closing them. The closures for the slots are of such character that, when closed, they complete the surfaces of the airfoil at the slotted regions. In special cases the slots may be permanently open.

In further explanation of the invention it may be said that it provides means, through a simple and inexpensive device, for dividing, aerodynamically rather than structurally, at the will of the pilot or automatically, the supporting surface or surfaces of an aircraft into panels along the span with little or no impairment of the maximum lifting force of the combination, or in other words, to change the lift distribution along the span of the supporting surface or surfaces of an aircraft so that it will be similar to that of the surface or surfaces composed out of separate panels along the span.

Again, it provides means for controlling the induced drag characteristic of the supporting surfaces, or of a part thereof, at the will of the pilot or automatically, without seriously affecting the magnitude of the maximum lift, and with simultaneous change of stalling angle for the part affected. Induced drag is one of the fundamental conceptions in aerodynamics. It has been defined as the air resistance consumed by the air for the creation of its downward motion, which is dependent only on the lift, span and velocity. To be exact, the induced drag is proportional to the square of lift, and inversely proportional to the square of effective span and the square of velocity. As in present heavier-than-air aircraft, at low speeds, the induced drag amounts to about 70% of the total drag, it can be readily seen how important it is, and how increasing it materially, or up to several times, along the whole wing or its part will powerfully affect the flying characteristics, and may also be used for directional control. From the definition of induced drag it is evident that if the span of the wing is changed the corresponding change in the induced drag will result. Thus, one aspect of my invention may be said to consist in changing the induced drag, and the character of the lifting force variation without seriously affecting its magnitude, at will of the pilot or automatically, along any part of the wing or its whole, by changing the effective span, or to put it in another way, by changing the aspect ratio of the wing. This change is attained by dividing the wing into parts as far as aerodynamic action is concerned, so that instead of one wing with one span, the effect becomes similar to that of a plurality of wings with different spans, but practically with the same total area as that of the original wing. Therefore, while the maximum lift will remain about the same, the induced drag and, consequently, the total drag will be considerably changed.

The object of my invention is typically accomplished by providing a vertical air passage or slot in each lateral wing section, these slots having a depth from the leading edge back equal to a minor portion of the chord, and means for opening and closing them simultaneously or separately, depending upon the specific results desired. The action of these slots is to break the smooth air-flow around the wing at these isolated regions. It was discovered that comparatively small slots when located near the leading edge, preferably in advance of the maximum ordinate of the wing, and intermediate the ends of the wing, are very effective for this purpose; thus, a slot of rectangular shape extending from the leading edge up to 25% of the chord, and about 8%–10% of the chord in width along the span, is about 85% as effective as if one actually cut the wing along the chord and used the parts separately. Consequently, by means of such slots or air passages one can easily divide the wing into sections or segregate any selected part of the wing from the rest, and thus have a complete control over the induced drag.

When the slots of this invention are open, strong vertical air jets shoot upward through the forward portio of the wing and change the lift distribution by substantially dividing the air-flow around the wing. The effectiveness of each slot depends on the amount of break in the smooth airflow, or the reduction in lift, at the isolated region along the span, but without destroying the flow around the rest of the wing. Increasing the depth of the slot beyond about 25% of the chord is practically of no value, and slots 10% deep give good results. The number of the slots along the span, and their dimensions, must be strictly limited, since if the slots were too wide or not distant enough, the force of the vertical air streams would be insufficient and the disturbance, instead of being localized, would spread along the span, the effective wing area would be materially decreased, and the object of the invention would be defeated. In order to prevent general disturbance and serious loss of lift, the slots must be distant from each other, the distance between them along the span being of the order of more than a chord length.

The subdivision of the wing aerodynamically into parts along the chord, outside of influencing the induced drag, has yet another feature which is of great importance, and that is that the stalling angle of the wing and the variation of lifting force beyond it are changed. This feature is due to the fact that wings of small aspect ratio (ratio of span to the chord), stall at the higher angles and have more gradual drop in the lift beyond the stall than wings of high aspect ratio. Consequently, since when the wing is subdivided by means of such slots it becomes for all aerodynamic purposes a combination of wings of small aspect ratio instead of one wing of high aspect ratio, the stalling angle is increased, the wing has wider useful range of the angles of attack, and the machine is less likely to go into a tail-spin. The importance of this feature, especially for lateral stability and controllability, can be readily appreciated if the fact is considered that it provides an easy way of making any part of the wing stall later than the rest, by segregating it.

In connection with this aspect of my invention, it may be noted that even continually open slots might be used to good advantage to increase the lateral control and improve the anti-spinning characteristics of an aircraft. In that case, the always open slots should be located near the wing tips, preferably about one chord length from them, as then, owing to the fact that lifting force is smaller at the wing tips, the induced drag of the whole plane will be only slightly affected, while as the result of the wing tips having larger angle of stall the improvement in the lateral control and spinning characteristics of the aircraft will follow.

In the accompanying drawings, forming part hereof:

Fig. 1 is a plan view of an airplane illustrating one form of execution of the invention, a portion of one of the wings broken away;

Fig. 2 is a vertical section on a larger scale taken on the line 2—2 of Fig. 1;

Figs. 3 and 4 are fragmentary plan views showing two forms of the slot and two forms of a closure, and also two forms of control mechanism;

Figure 7:
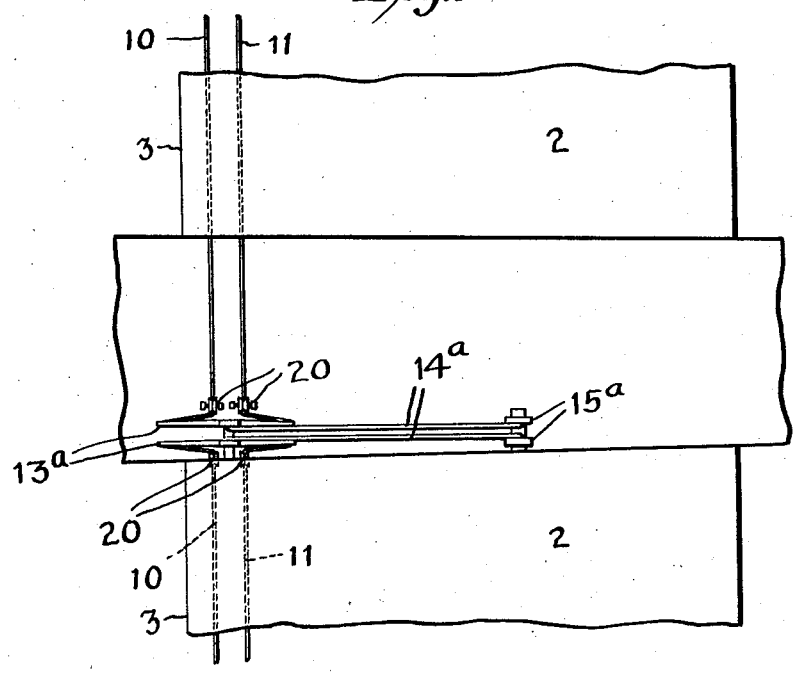
Figure 8:
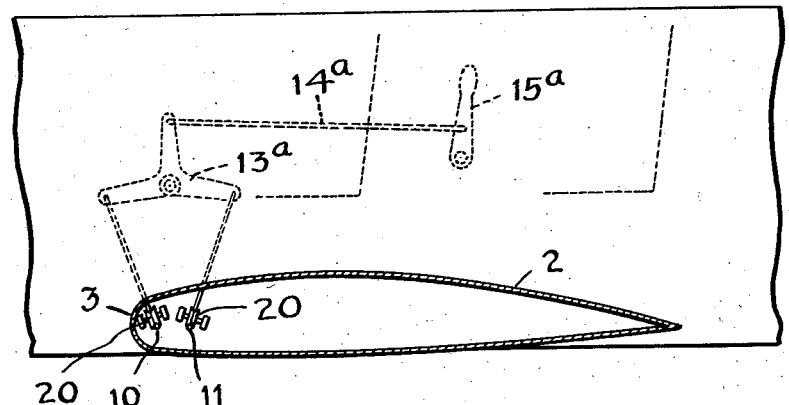

Figs. 5 and 6 are vertical sections on the lines 5—5 and 6—6 of Figs. 3 and 4, respectively;

Fig. 7 is a fragmentary and somewhat schematic plan view showing a form of double hand-lever control which can be operated jointly or severally; and Fig. 8 is a side sectional elevation corresponding to Fig. 7.

Fig. 1 illustrates a conventional airplane having a wing comprising right and left supporting wings or sections 2. It will be understood that the machine may be a monoplane, biplane or triplane, and that the slots may be provided in any one or more of these supporting surfaces. It will also be understood that the invention is applicable to airfoils generally.

The leading edge is marked 3. The numeral 4 designates the covering forming the upper and lower surfaces of the wing, and 5 are the vertical slots. In Figs. 1 and 2 the slots are shown as extending between the leading edge strip and a front spar 6.

The closures 7 are preferably box-like structures which slide parallel with the span inside the front part of the wing. In Figs. 1–3 and 5 they slide on a pair of guide rods 8 which are secured at their opposite ends in ribs 9. The top and bottom of the closures conform to the upper and lower surfaces of the wing, so that these surfaces are completed at the slots when the slots are closed. When I speak of closing the slots, it may be understood that it is not necessary to close them completely, since the closing movement of the closures may be limited so as to leave them partly open.

In Fig. 1 the slots and the closures are rectangular, or have substantially parallel sides, parallel with the chord. Fig. 3 illustrates the fact that the side of the closure may be oblique to secure gradual opening and closing of the slot, whereas in Fig. 4 a side of the slot is oblique.

Many other forms of closures, including panels on the upper and lower surfaces of the wing, sliding either along the span or along the chord, may be employed.

In Figs. 1–3 and 5, each closure is operated by two cables 10 and 11 secured to the box, the closing cable passing about a pulley 12, and both cables being connected to a double bell-crank 13.

From these bell-cranks, push-and-pull rods 14 extend to separate pedals 15 in the cockpit. Control pedals for the closures may be associated with the rudder bar or rudder pedals in the same way that brake pedals for the landing gear are now associated, and similar operating connections, which it is not necessary to illustrate, may be employed.

The use of separate, or independently operable, pedals or levers for the slot closures of the right and left wings makes it possible for the operator either to open or close the slots simultaneously or to open the slot in the front part of the right wing without opening the slot in the left wing, or vice versa, or to open the slots to different extents, or to open one slot while closing the other. Naturally, however, the control connections may lead to a common control organ which will compel the slots to be opened and closed simultaneously, or to a common control organ different movements of which will open one slot or the other.

Figs. 7 and 8 illustrate a simple and convenient hand-lever control for the closures. The opening and closing cables 10 and 11 pass under pulleys 20 in front of the cockpit and are connected to double bell-cranks 13ᵃ, from which push-and-pull rods 14ᵃ extend to a pair of adjacent control levers 15ᵃ. These levers are pivoted on the same axis and so close together that the pilot can grasp both of them in one hand and operate them to open or close the slot closures of both wings (right and left) simultaneously; or he can easily operate one and not the other, and vice-versa.

In Figs. 4 and 6, the closure is operated through a push-and-pull rod 16, which is connected by a head 17 to the ends of a pair of slide rods 18, which are guided in bushings 19 in the ribs 9, the closure being fixed to these rods.

Many other forms of control, mechanical or hydraulic, may be employed.

The depth of the slots along the chord may vary from about 10%–25% of the chord. The width along the span may vary from about 5%–10% of the chord. For the purpose of the invention the slots must be of small dimension along the span, but there is a limit of narrowness in this direction below which they are not effective. While I am not able to state the precise lower limit of width applicable to all cases, at which lower limit slots though open have practically no effect, it is a fact that if the slots are too narrow the result is practically the same as if no slots were present. Generally speaking, I believe that a width equal to about 4% of the chord is a minimum. These figures are given by way of illustration.

By means of the invention it is possible to decrease the lift to drag ratio of the aircraft as much as two-thirds, if as great a change as that should be desired, without materially affecting the lift, or putting the aircraft in a condition where the controls will be ineffective. The results are accomplished either by directly increasing the drag through the change of the induced drag, or by making safe the flying of an aircraft at high angles through the improvement of the controls and change in lifting force variation. The identical slots accomplish both purposes and it depends only on their location along the span, which factor is more pronounced. It may be assumed that the best results will be achieved by the proper combination of both effects, depending on the type of the aircraft.

A single slot in each of the right and left wings will be sufficient in most instances, though in special planes there might be more than two slots in the entire span. Single slots located about one-third the distance along the span from the center give the most pronounced increase in induced drag. If they are located farther along the span, more nearly in front of the ailerons 21, or in front of their inner ends, they have the most pronounced effect on these controls. In such positions, they make the lateral control effective at very high angles, even beyond the burble point of the rest of the wing. In Fig. 1, they are shown in compromise positions.

The slot closures may be interconnected for automatic operation with other parts. Thus, they may be interconnected with the rudder or with the ailerons. When using the invention for changing the gliding characteristics, and especially if a self-landing machine is desired, the operation of the openings may be connected with the elevator control mechanism. Furthermore, if soft landings are desired, it can be connected with the flaps or any other available lift-increasing device.

Mention should also be made of the feasibility of forming the slots through the fuselage at the inner ends of the right and left wing sections, the effect being that of a vertical slot through the center section of the wing.

Referring again to some of the uses and advantages of the invention:

The slots can be used as air brakes, to escape collision in flight, cut down landing run, etc.

The slots are useful to change the gliding characteristics of the aircraft by making the aircraft glide with satisfactory lateral stability and control on a flight path by far steeper than any safely permissible on the present ships, thus making possible landing on small and restricted areas, and furthermore, permitting steep gliding straight into the ground and making safe and satisfactory landing with very short landing run without leveling off, and therefore with less skill and without the particularly good eyesight (depth perception) required for the present type landings; in other words, to make virtually self-landing aircraft.

The slots improve the controllability and and maneuverability of the aircraft, in which case the slots may be used in conjunction with the present lateral or directional control or even completely displace the latter. The use of the slot for this purpose will considerably improve the lateral controls in dangerous position, and insure positive powerful directional control under any flight condition whatever. As results,—the sharper turns, the control of the tailspin and even of the flat spin (which is impossible on the present ships) may be achieved, and some new maneuvers at the present unknown in aviation will be made possible.

The slots definitely improve the lateral control and anti-spinning characteristics of an aircraft.

I claim:

1. In an airplane, a wing with means for virtually dividing it in flight into a few panels of small aspect ratio, by the action of a strong, localized atmospheric jet striking up through the front of the wing and cleaving the smooth airflow around the wing without spread of disturbance along the span and without materially affecting the magnitude of maximum lift, said means consisting of a single slot of vertical character, substantially free and unobstructed, of small dimension along the span, and extending from the leading edge rearward, the upper limit for the depth of said slot being substantially 25% of the chord and the upper limit for the width of said slot being about 10% of the chord, and means for opening and closing the slot, substantially as set forth.

2. An improvement in heavier-than-air aircraft, in which the wing is provided in the leading edge portion, at regions distant more than a chord length from each other along the span, with a few substantially free and unobstructed slots or openings which extend rearward from the leading edge, the character and location of the slots being such that strong, localized air jets striking up through them will cleave the smooth airflow around the wing and virtually divide the wing into a few panels of small aspect ratio, the upper limit for the depth of said slot being substantially 25% of the chord and the upper limit for the width of said slot being about 10% of the chord, and means for opening and closing said slots, substantially as set forth.

3. An improvement in heavier-than-air aircraft, in which the wing or supporting surface is provided in advance of the maximum ordinate, at a point from one-third to one-half the length of the wing out from the center of the span, with a single substantially free and unobstructed slot or opening of vertical character, the upper limit for the depth of said slot being substantially 25% of the chord and the upper limit for the width of said slot being about 10% of the chord, and means for opening and closing said slots, substantially as set forth.

4. An improvement in heavier-than-air aircraft in which the wing is provided in the leading edge portion, at regions distant more than a chord length from each other along the span, with a few substantially free and unobstructed slots or openings which extend rearward from the leading edge, the character and location of the slots being such that strong, localized air jets striking up through them will cleave the smooth airflow around the wing and virtually divide the wing into a few panels of small aspect ratio, the upper limit for the depth of said slot being substantially 25% of the chord and the upper limit for the width of said slot being about 10% of the chord.

5. An improvement in heavier-than-air aircraft according to claim 2, in which the means for opening and closing a slot comprises a hollow box-like member guided in the interior of the wing and adapted to blank the slot openings.

CONSTANTINE L. ZAKHARTCHENKO.